(12) United States Patent
Akahori

(10) Patent No.: US 6,455,965 B2
(45) Date of Patent: Sep. 24, 2002

(54) SPINDLE MOTOR HAVING AN EXTENDED OUTER RING ABOVE A HUB

(75) Inventor: Tadashi Akahori, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 09/899,299

(22) Filed: Jul. 6, 2001

(30) Foreign Application Priority Data

Jul. 18, 2000 (JP) ........................................ 2000-217373

(51) Int. Cl.[7] ................................................. H02K 5/16
(52) U.S. Cl. ..................... 310/90; 360/99.08; 360/98.07
(58) Field of Search ........................ 310/90, 194, 67 R; 360/99.08, 99.07, 98.08, 99.12; 384/492, 490, 493; 29/894

(56) References Cited

U.S. PATENT DOCUMENTS

| | | | |
|---|---|---|---|
| 5,045,738 A | * 9/1991 | Hishida et al. | 310/90 |
| 5,138,209 A | * 8/1992 | Chuta et al. | 310/67 |
| 5,160,866 A | * 11/1992 | Hishida et al. | 310/90 |
| 5,639,168 A | * 6/1997 | Noguchi et al. | 384/492 |
| 5,698,919 A | * 12/1997 | Obara | 310/90 |
| 5,821,646 A | * 10/1998 | Chuta et al. | 310/67 |
| 5,841,210 A | * 11/1998 | Obara | 310/90 |
| 5,844,748 A | * 12/1998 | Dunfield et al. | 360/99.08 |
| 5,860,749 A | * 1/1999 | Hirakawa et al. | 384/492 |
| RE36,086 E | * 2/1999 | Hishida et al. | 310/90 |
| 5,880,545 A | * 3/1999 | Takemura et al. | 310/90 |
| 5,933,292 A | * 8/1999 | Obara | 360/99.08 |
| 5,940,247 A | * 8/1999 | Karis | 360/99.08 |
| 6,217,221 B1 | * 9/1999 | Abe et al. | 384/493 |
| 6,181,513 B1 | * 1/2000 | Obara | 360/99.08 |
| 2001/0022478 A1 | * 9/2001 | Obara et al. | 310/90 |

FOREIGN PATENT DOCUMENTS

| | | | |
|---|---|---|---|
| JP | 03277157 A | * 12/1991 | H02K/29/00 |
| JP | 000592214 A2 | * 7/1993 | H02K/7/08 |
| JP | 000597678 A1 | * 9/1993 | H02K/7/08 |
| JP | 06153447 A | * 4/1994 | H02K/5/173 |

OTHER PUBLICATIONS

Merriam–Webster's Collrgiate Dictionary, 10th ed., Merriam–Webster Incorporated, pp. 1006–1007.*

* cited by examiner

Primary Examiner—Karl Tamai
Assistant Examiner—Heba Yousri Elkassabgi
(74) Attorney, Agent, or Firm—Oliff & Berridge PLC

(57) ABSTRACT

In a spindle motor in which its weight is decreased while maintaining the rigidity of a bearing to a large value, the widthwise dimension of a bearing cartridge assembly 11 is set so that the upper outer ring end portion 12b of the outer ring 12 of the bearing cartridge assembly 11 protrudes from a hub main body 6A. Since the lengthwise dimension of a hub 5A is smaller than that of a prior art, the weight and cost can be decreased that much. Further, the lengthwise dimension of the hub 5A is smaller than that of the prior art, a space portion is increased and the space portion can be employed as a space for arranging various kinds of members. Since the upper outer ring end portion 12b protrudes from the hub main body 6A, fitting pressure is not exerted on the upper outer ring end portion 12b of the outer ring 12 upon fitting, so that the generation of unnecessary deformation or the like can be avoided.

1 Claim, 2 Drawing Sheets

SPINDLE MOTOR HAVING AN EXTENDED OUTER RING ABOVE A HUB

BACKGROUND OF THE INVENTION

1. Field of the Invention

The present invention relates to a spindle motor for driving a magnetic disk employed for a hard disk drive device of a computer.

2. Description of the Related Art

In a hard disk drive device, the development of a large capacity hard disk drive device has been recently promoted. In order to meet the demand for such a large capacity in the hard disk drive device, the spindle motor used in the hard disk drive device must rotate at high speed.

As an example of the spindle motor employed for the hard disk drive device, a device shown in FIG. 2 has been known. This spindle motor (spindle motor for driving a magnetic disk) 1 comprises a base member 3 provided with a stator 2 and a hub 5 provided with a magnet 4 opposing to the stator 2. The hub 5 is formed in a substantially tubular shape with a prescribed height so that a magnetic disk (not shown) is fitted to its outer peripheral portion.

The hub 5 comprises a substantially annular hub main body 6 for holding the magnetic disk; a tubular portion with a bottom (hub tubular portion) 7 connected to one end portion (the lower side in FIG. 2) of the hub main body 6; and a tubular hub extended portion 8 extended from the other end portion (the upper side in FIG. 2) of the hub main body 6.

A fixed shaft 10 standing upright on the base member 3 is inserted into a hole (hub hole) 9 formed in the hub main body 6 and the hub extended portion 8. A bearing cartridge assembly 11 is interposed between the fixed shaft 10 and the hub 5. The hub 5 is rotatably supported on the fixed shaft 10 through the bearing cartridge assembly 11.

The bearing cartridge assembly 11 is a bearing (ball bearing) of a type comprising one outer ring 12 and two inner rings (reference numerals are omitted) with a prescribed distance provided therebetween. The end portion of the outer ring 12 in the side of the base member 3 (the lower side in FIG. 2, hereinafter referred to as lower outer ring end portion 12a) protrudes downward from the hub main body 6 in FIG. 2. An end portion in the side opposed to the lower outer ring end portion 12a of the outer ring 12 (the upper side in FIG. 2, hereinafter referred to as upper outer ring end portion 12b) substantially reaches the front end portion of the hub extended portion 8.

In this spindle motor 1, since the widthwise dimension (span) of the outer ring 12 of the bearing cartridge assembly 11 is relatively large, the rigidity of the bearing cartridge assembly (bearing) 11 is high, and accordingly, the unsteadiness of the hub 5 is prevented and running accuracy is high.

In the spindle motor 1, it has been desired to reduce the weight thereof In order to attain the purpose, it may be taken into consideration to reduce the length dimension of the fixed shaft 10 and the widthwise dimension (vertical dimension in FIG. 2) of the bearing cartridge assembly 11 and determine the height of the hub 5 so as to be substantially equal to the height of the end face of the fixed shaft 10 and the end portion of the bearing cartridge assembly 11 whose dimensions are reduced as described above.

However, in the attempt described above, the widthwise dimension (vertical dimension in FIG. 2) of the bearing cartridge assembly 11 is reduced, so that the rigidity of the bearing cartridge assembly 11 is undesirably lowered. Accordingly, the hub 5 is apt to be unsteady upon operation of the spindle motor 1, so that running accuracy may possibly be deteriorated.

SUMMARY OF THE INVENTION

The present invention has been made in view of the above circumstances, and an object of the present invention is therefore to provide a spindle motor in which the high rigidity of a bearing can be maintained and the weight can be decreased.

For achieving the object described above, according to one aspect of the present invention, there is provided a spindle motor comprising:

a hub to which a magnetic disk is fitted;

a base member;

a fixed shaft vertically provided on the base member; and a bearing, the hub being rotatably supported on the fixed shaft through the bearing, characterized in that an end portion of an outer ring of the bearing at the front end side of the fixed shaft is set to protrude relative to a bearing holding portion of the hub on which the outer ring of the bearing is held.

BRIEF DESCRIPTION OF THE DRAWINGS

In the acompanying drawings.

DETAILED DESCRIPTION OF THE PREFERRED EMBODIMENT

Figure 1:
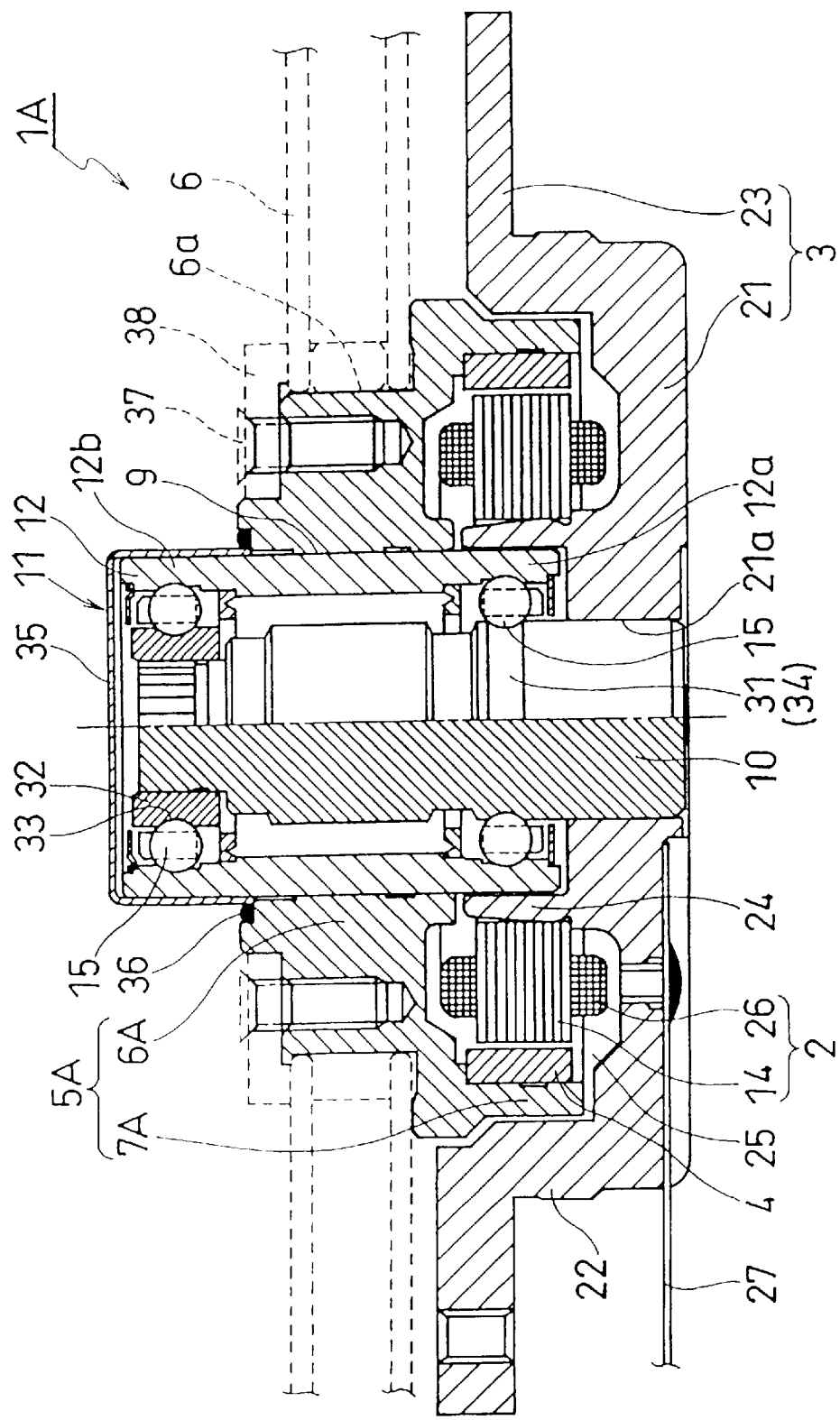
FIG. 1 is a sectional view showing a spindle motor according to an embodiment of the present invention.

An embodiment of a spindle motor 1A according to the present invention will now be described with reference to FIG. 1.

A spindle motor 1A generally comprises a base member 3 provided with a stator 2 and a hub 5A to which a magnetic disk 6 is fitted and which is provided with a magnet 4 so as to be opposed to the stator 2.

The base member 3 generally comprises a substantially ring-shaped base main body 21 with a bottom having a hole 21a (base hole) formed on its central portion and a flange 23 extending radially outward from the end portion of the outer peripheral wall 22 of the base main body 21.

On one surface side (the upper side in FIG. 1) of the base main body 21, an annular inner peripheral wall 24 whose inside diameter dimension is larger than the inside diameter of the base hole 21a is stood upright. An annular space 25 is formed between the inner peripheral wall 24 and the outer peripheral wall 22.

The stator 2 is held to the outer peripheral portion of the inner peripheral wall 24. The stator 2 comprises a stator stack 14 and a coil 26 wound on the stator stack 14 and is arranged in the annular space 25 while the stator stack 14 is held to the inner peripheral wall 24.

The coil 26 is connected to an external circuit (not shown) through a flexible cable 27 to which its lead wire (not shown) is connected.

A fixed shaft 10 is arranged upright and fitted to the base hole 21a of the base main body 21.

The hub 5A is made of aluminum and stainless steel materials. The hub 5A has a substantially annular hub main body (bearing holding portion) 6A provided with a hub hole 9 in the inside thereof. The hub main body 6A is inserted into the disk-fitting hole 6a of the magnetic disk 6 to hold the magnetic disk 6. To one end portion (the lower side in FIG. 1) of the hub main body 6A, a tubular portion with a bottom (hub tubular portion) 7A is connected and housed in the annular space 25. In the inner peripheral portion of the hub tubular portion 7A, the magnet 4 is held with a gap having a prescribed width formed between the stator 2 and the hub tubular portion 7A.

A bearing cartridge assembly 11 is fitted to the hub hole 9 of the hub main body 6A and interposed between the fixed shaft 10 and the hub 5A. The hub 5A is rotatably supported on the fixed shaft 10 through the bearing cartridge assembly 11.

The bearing cartridge assembly 11 is a bearing (ball bearing) of a type comprising one outer ring 12 and two inner rings with a prescribed distance provided therebetween.

Specifically, an annular groove (first annular groove 31) is formed on the fixed shaft 10 in the vicinity of the base member 3. Further, an annular groove (second annular groove) 33 is formed on the outer peripheral portion of a ring member 32 connected through a spline to the end portion of the fixed shaft 10. While a portion 34 in which the first annular groove 31 is formed on the fixed shaft 10 forms one inner ring, the ring member 32 in which the second annular groove 33 is formed forms the other inner ring. Further, in portions corresponding to the first and second annular grooves 31 and 33 on the outer ring 12, annular grooves are respectively formed (reference numerals are omitted). Balls 15 are housed in spaces (reference numerals are abbreviated) formed together with the first and second annular grooves 31 and 33. The bearing cartridge assembly 11 configured as described above is composed of such a bearing (ball bearing) as a type comprising one outer ring 12 and two inner rings (the portion 34 in which the first annular groove 31 is formed and the ring member 32) with a prescribed distance provided therebetween.

According to this embodiment, the outer ring 12 is made of a material with an expansion coefficient different from that of the hub 5A.

The outer ring 12 of the bearing cartridge assembly 11 is fitted to the hub hole 9.

The end portion of the outer ring 12 (the lower side in FIG. 1, hereinafter referred to as lower outer ring end portion 12a) in the side of the base member 3 protrudes downward from the hub main body 6A in FIG. 1 and faces the inner peripheral wall 24 of the base member 3. Further, the widthwise dimension (vertical dimension in FIG. 1) of the end portion of the outer ring 12 opposed to the lower outer ring end portion 12a (the upper side in FIG. 1, hereinafter referred to as upper outer ring end portion 12b) is set so that the upper outer ring end portion 12b protrudes upward from the hub main body 6A in FIG. 1. The lengthwise dimension (vertical dimension in FIG. 1) of the hub 5A is smaller than that of the prior art shown in FIG. 2, which substantially corresponds to that of the hub with no hub extended portion 8 shown in FIG. 2.

In FIG. 1, reference numeral 35 designates a cover with which the bearing cartridge assembly 11 is covered. The cover 35 is fixed to the hub 5A by fixing means 36 such as an adhesive, welding or the like. Reference numeral 37 denotes a screw adapted to secure a cover 38 for pressing the magnetic disk 6.

Figure 2:
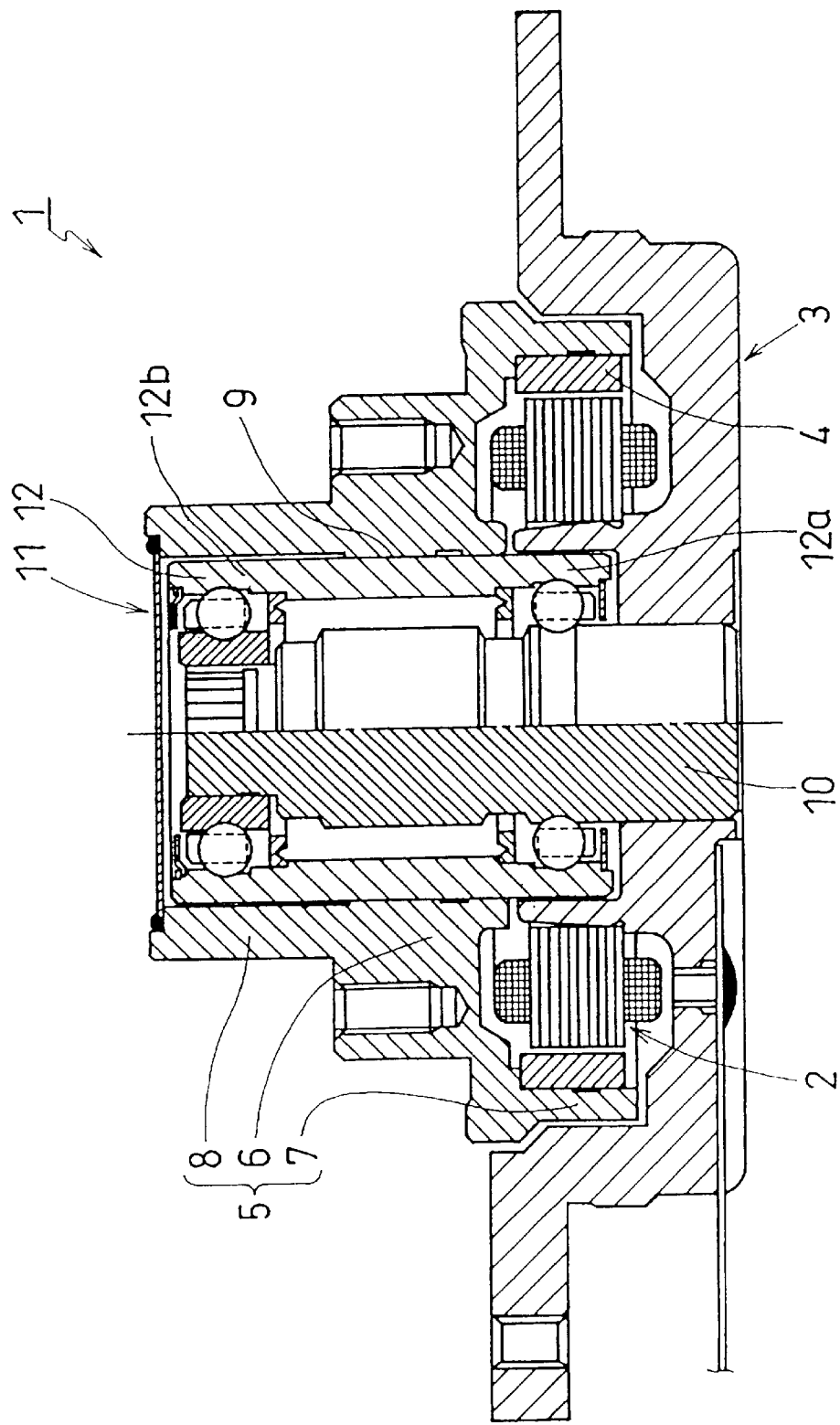
FIG. 2 is a sectional view showing a conventional example of a spindle motor.

In the spindle motor 1A formed as described above, since the widthwise dimension is set so that the upper outer ring end portion 12b protrudes from the hub main body 6A and the lengthwise dimension of the hub 5A is smaller than that of the prior art shown in FIG. 2, the weight and the cost thereof can be reduced that much. Further, since the lengthwise dimension of the hub 5A is smaller than that of the prior art, the space portion can be increased and the space can be used as a place for arranging various kinds of members.

In the spindle motor 1A formed as described above, the bearing cartridge assembly 11 is fitted and attached to the hub hole 9. At this time, the bearing cartridge assembly 11 is fitted to the hub hole 9 from the side of the lower outer ring end portion 12a. In the present embodiment, the upper outer ring end portion 12b protrudes from the hub main body 6A as described above, and therefore, fitting pressure is not exerted on the upper outer ring end portion 12b of the outer ring 12 upon fitting. Thus, the generation of unnecessary deformation or the like can be avoided and the running accuracy can be improved.

The upper outer ring end portion 12b of the outer ring 12 made of the material with an expansion coefficient different from that of the hub 5A protrudes from the hub main body 6A as described above and does not come into contact with the hub main body 6A. On the other hand, if the upper outer ring end portion 12b comes into contact with a material with an expansion coefficient different from that of the upper outer ring end portion 12b, the upper outer ring end portion 12b may be influenced by the temperature and, depending on situations, might possibly be deformed, which causes the running accuracy to be deteriorated. However, in the present embodiment, since the upper outer ring end portion 12b does not come into contact with the hub main body 6A (hub 5A) as described above, the upper outer ring end portion 12b is less affected by the temperature as compared to the case in which the upper outer ring end portion 12b is brought into contact with the hub 5A. Therefore, both the deformation and the running accuracy deterioration that accompanies with the deformation can be suppressed.

Furthermore, the outer ring 12 of the bearing cartridge assembly 11 is set to a large size similarly to the prior art. Therefore, the rigidity of the bearing cartridge assembly 11 is improved that much and the unsteadiness of the hub 5A can be prevented, hence the running accuracy is enhanced.

According to the one aspect of the present invention, since the end portion on the front end side of the fixed shaft in the outer ring of the bearing is set so that it protrudes from the bearing holding portion of the hub, high rigidity of the bearing can be maintained and the unsteady state of the hub can be prevented, whereby the running accuracy can be improved.

What is claimed is:

1. A spindle motor, comprising:
a hub to which a magnetic disk is fitted;
a base member;
a fixed shaft standing upright on said base member; and
a bearing including an inner ring member and one outer ring member;
said hub being rotatably supported on said fixed shaft through said bearing, characterized in that an upper end portion of the inner ring member and one outer ring member of said bearing at a front end side of said fixed shaft protrudes from a top end surface of the hub.

* * * * *